United States Patent [19]
Richardson

[11] Patent Number: 5,643,129
[45] Date of Patent: Jul. 1, 1997

[54] SPEED REDUCTION GEARSET AND TORQUE SPLIT DIFFERENTIAL MECHANISM

[75] Inventor: John A. Richardson, Windsor, Canada

[73] Assignee: Ford Motor Company, Dearborn, Mich.

[21] Appl. No.: 509,370

[22] Filed: Jul. 31, 1995

[51] Int. Cl.$^6$ .................... F16H 48/10; F16H 3/50
[52] U.S. Cl. .................. 475/204; 475/206; 475/248; 475/298; 180/248; 180/249
[58] Field of Search .................. 475/204, 206, 475/220, 248, 298; 180/248, 249

[56] References Cited

FOREIGN PATENT DOCUMENTS

| 362678 | 4/1990 | European Pat. Off. | 180/248 |
| 63-38036 | 2/1988 | Japan | 180/249 |
| 1-203740 | 8/1989 | Japan | 475/298 |

*Primary Examiner*—Charles A. Marmor
*Assistant Examiner*—Nathan O. Jensen
*Attorney, Agent, or Firm*—Frank G. McKenzie

[57] ABSTRACT

A speed reduction and differential mechanism assembly includes an input shaft; first and second output shafts; a planetary gearset comprising a sun gear, ring gear, carrier and planet gears rotatably supported on the carrier and in continuous meshing engagement with the sun gear and ring gear: and means for shifting the gearset between positions spaced mutually along the input shaft, a first position where the input shaft driveably engages the sun gear, the first and second output shafts driveably engage the carrier and the ring gear is held against rotation; a second position where the input shaft driveably engages the carrier, the sun gear driveably engages the first output shaft, and the ring gear driveably engages the second output shaft.

6 Claims, 2 Drawing Sheets

5,643,129

SPEED REDUCTION GEARSET AND TORQUE SPLIT DIFFERENTIAL MECHANISM

BACKGROUND OF THE INVENTION

1. Field of the Invention

This invention relates to the field of gearsets for transmitting power and differential drive mechanisms. More particularly, the invention pertains to planetary gear mechanisms.

2. Description of the Prior Art

In the powertrain of a motor vehicle adapted to switch alternately between four-wheel drive and two-wheel drive, in accordance with a selection made by the vehicle operator, the transfer case is located in the powertrain behind a multiple-speed transmission and ahead of the driven wheel axle shafts. The transfer case conventionally includes a planetary gearset adapted to produce a high speed gear reduction and a low speed gear reduction when driven by the output shaft of the transmission in accordance with the high or low range selected by the vehicle operator. Power is transmitted from the transfer case rearward to the rear axle shaft and by a chain in the mechanism to a forward drive shaft that is connected to an axle differential mechanism and the front axle shaft.

U.S. Pat. Nos. 4,648,492 and 4,632,207 describe a transfer case of this type.

SUMMARY OF THE INVENTION

It is an object of this invention to provide a mechanism for producing a speed reduction between input and output and torque split differential between two outputs of a transfer case through operation of a single planetary gearset controllable by a vehicle operator.

This invention has the advantage of reducing the axial length of the transfer case required to house the necessary components and producing a lighter transfer case, at lower cost.

A speed reduction and differential mechanism assembly according to this invention includes an input shaft, first and second output shafts driveably connected to forward and rear axle shafts; a planetary gearset comprising a sun gear, ring gear, carrier, and planet gears rotatably supported on the carrier and in continuous meshing engagement with the sun gear and ring gear; and means for shifting the gearset between first and second positions spaced mutually along the input shaft, a first position where the input shaft driveably engages the sun gear, the first and second output shafts driveably engage the carrier and the ring gear is held against rotation; a second position where the input shaft driveably engages the carrier, the sun gear driveably engages the first output shaft, and the ring gear driveably engages the second output shaft.

DESCRIPTION OF THE PREFERRED EMBODIMENT

Figure 2:
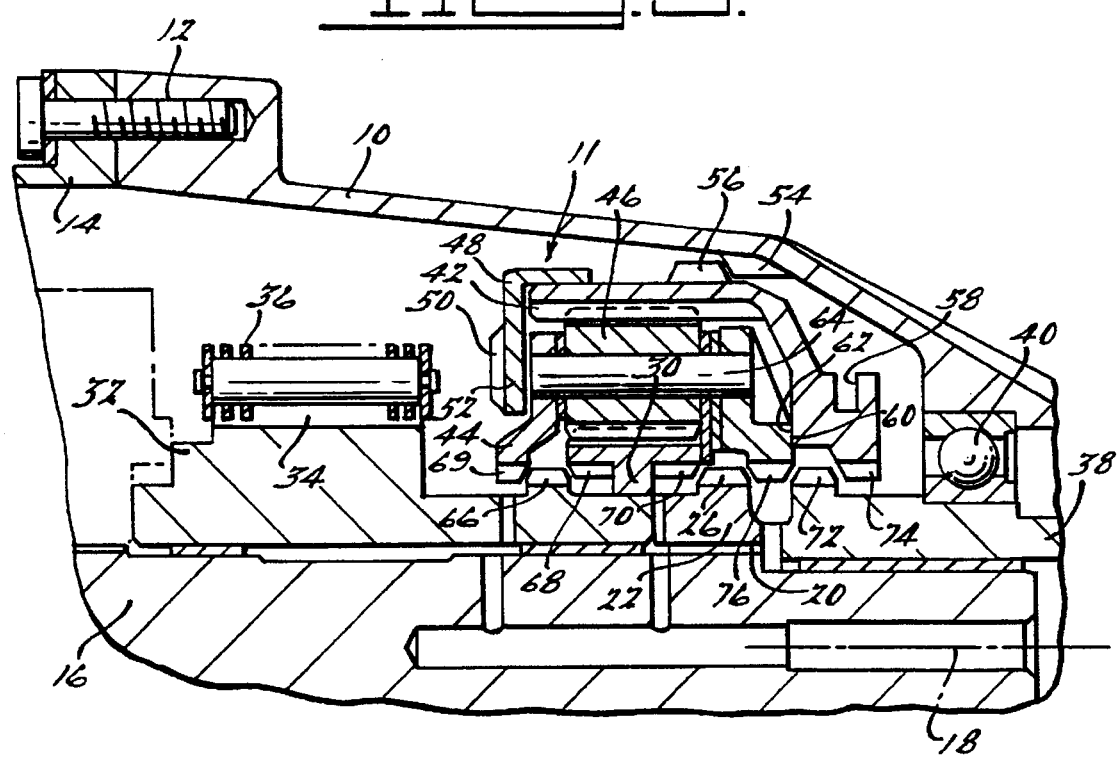
FIG. 2 is a cross section similar to that of FIG. 1, showing the mechanism in a neutral position.

Referring first to FIG. 2, the casing 10 of a transfer case is connected through a bolted attachment 12 to an attachment flange carried on the rear face of a transmission extension casing 14. The input shaft 16 of the transfer case, which is driveably connected to the transmission output shaft, extends rearward along a longitudinal axis 18 and is driven at multiple speeds the transmission is capable of producing. The outer surface of the transfer case input shaft 16, which is either formed integrally with the output shaft or driveably connected to the output shaft of the transmission, is formed with a spline 20, through which input driver ring 22 is driveably connected to input shaft 16. Driver ring 22 is formed on its radially outer surface with a set of spline teeth 26, aligned substantially with axis 18 and adapted to engage internal spline teeth formed on a sun gear 30.

A first output shaft 32, in the form of a sleeve shaft surrounding input shaft 16, carries an upper chain sprocket 34, which is driveably engaged by a drivebelt or chain 36. A lower sprocket wheel (not shown), supported rotatably and driveably connected to a shaft parallel to input shaft 16, driveably connects the front axle shaft through a differential mechanism adapted to drive the left-hand and right-hand wheels located at the opposite outboard ends of the front axle shaft. Drivebelt 36 driveably engages the sprocket wheel on the parallel shaft.

A second output shaft 38, in the form of a sleeve shaft surrounding input shaft 16, extends rearward from gearset 11 and is supported rotatably on the transfer case 10 at a bearing 40.

Planetary gearset 11 includes sun gear 30, which is journalled on the outer surface of the first output shaft 32, a ring gear 42 surrounding sun gear 30, carrier 44, and a set of planet pinions 46, supported rotatably on the carrier and in continuous meshing engagement with ring gear 42 and sun gear 30. The forward axial end of the ring gear is fitted with a sleeve 48, is welded to the forward outer surface of the ring gear and formed with a scoop 50, which extends radially inward and axially outward from the surface of sleeve 48. As ring gear 42 rotates, it passes through a bath of lubricating fluid located in casing 10 such that the scoop directs lubricant from the bath through an opening 52, formed in sleeve 48, and toward the interior components of gearset 11.

Figure 1:
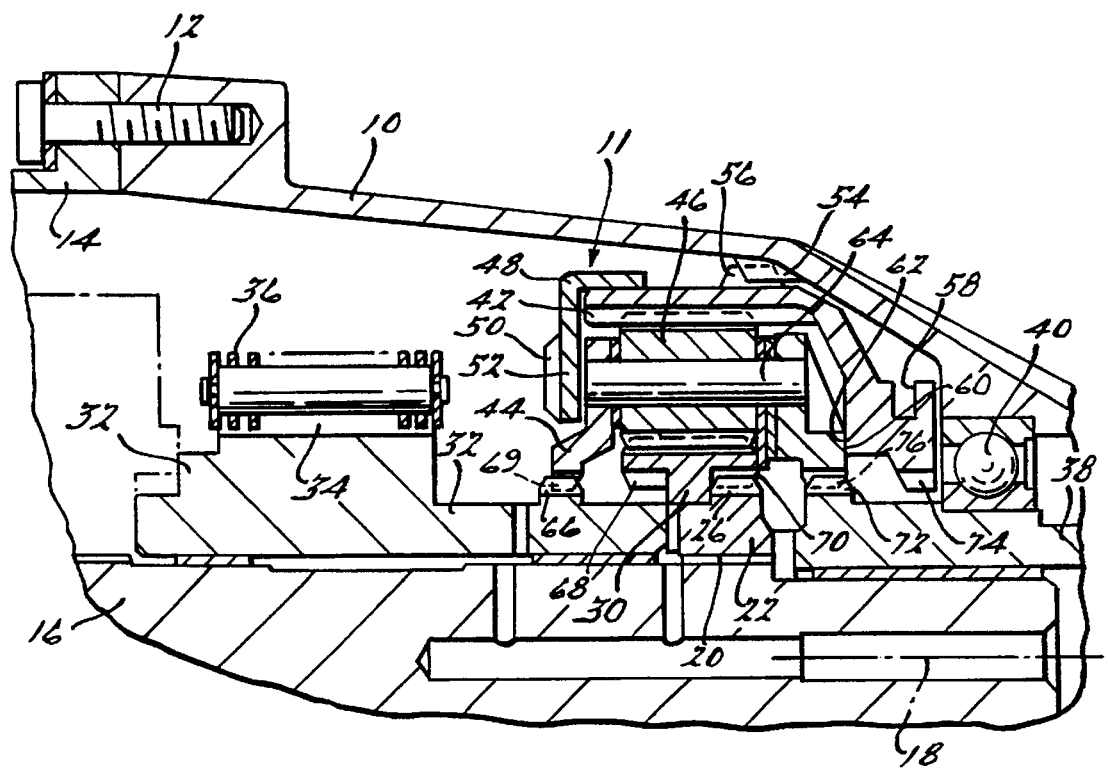
FIG. 1 is a cross sectional view through a longitudinal axis of a transfer case taken at a central plane through a planetary gear assembly showing only that portion above the center line: The figure shows the assembly in the low gear position.

Formed on the inner surface of casing 10 is an internal spline 54, which is adapted to mesh with an external spline 56 formed on the radially outer surface of ring gear 42 when the ring gear is moved axially rearward from the position shown in FIG. 2 to the position shown in FIG. 1. When splines 54, 56 are mutually engaged, ring gear 42 is held against rotation on casing 10.

The ring gear is formed with an annular recess 58, into which can be fitted a shift fork that moves axially in response to operator input according to whether the vehicle operator selects a low gear operation of the transfer case under conditions that maximize engine torque, or whether the operator selects torque split differential operation of the transfer case. When ring gear 42 is moved rearward to the position of FIG. 1, sleeve 48 contacts the axially forward surface of carrier 44 and moves the carrier, ring gear, and sun gear rearward. When the shift fork is actuated to move ring gear 42 to the forward position shown in FIG. 3, contact between the axially rearward surface 60 of carrier 44 and the adjacent axial surface 62 of the ring gear forces the carrier, the planet pinion, sun gear, and stub shaft 64, on which the planet pinions are rotatably supported, to move forward.

Figure 4:
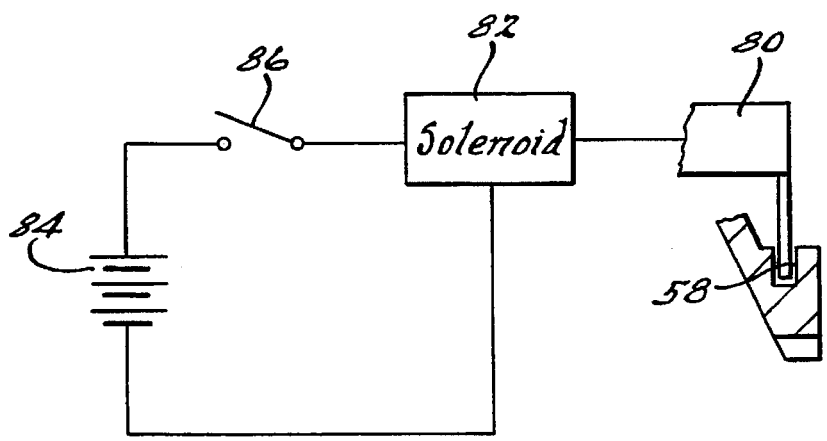
FIG. 4 is a schematic diagram showing a circuit for use in actuating components of the assembly shown in FIGS. 1–3. The actuator moves the mechanism among the various operating positions.

FIG. 4 shows a shift fork 80 located in the annular recess 58 of ring gear 42 and driveably connected to an actuating component 82, which may be an electrical solenoid, vacuum motor, electric motor, or other such actuating device. Preferably, component 82 is an electrical solenoid, connected through a circuit to a source of electric power 84, the circuit being closed by a switch 86 controlled by the vehicle operator to operate the transfer case in the differential torque split mode, or in the low-gear, speed reduction mode.

The forward or first output shaft 32 is formed with an external spline 66 adapted to engage alternately spline 68, formed on the forward radially inner surface of sun gear 30, or the spline 69, formed on the inner forward surface of carrier 44. The rear or second output shaft 38 is formed with an external spline 72 adapted to engage alternately spline 74, formed on the radially inner surface of ring gear 42, or the spline 76, formed on the radially inner surface of carrier 44. Spline 26, formed on the outer surface of input driver ring 22, is adapted to engage alternately spline 76 or spline 70, formed on the radially inner, rearward surface of sun gear 30.

In operation, the transfer case operates in a low-gear mode, the position shown in FIG. 1, when shift fork 80 moves gearset 11 rearward, thereby bringing splines 54, 56 into mutual engagement. Sun gear 30 is driven by input shaft 16 through driver ring 22, ring gear 42 is held against rotation, and the output is taken at carrier 44, which drives forward output shaft 32 due to the mutual engagement of splines 66 and 69. The rearward drive shaft 38 is driven from carrier 44 through engagement of splines 72 and 74.

Figure 3:
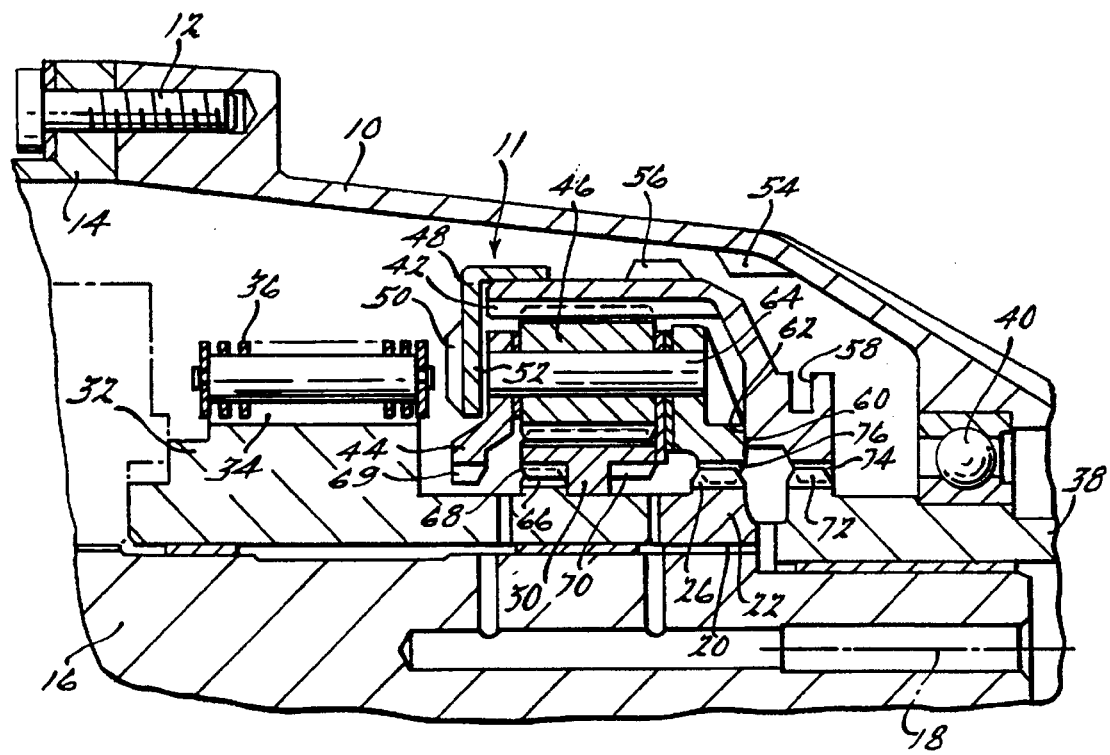
FIG. 3 is a cross section similar to that of FIG. 1, showing the mechanism in a torque split differential position.

When the vehicle operator selects the differential mode of operation, shift fork 80 moves gearset 11 forward, thereby disengaging the ring gear from its fixed position on case 10 and moving it to the position shown in FIG. 3. Carrier 44 is driven from the input shaft 16 through driver ring 22 and the mutual engagement of splines 26 and 76. Ring gear 42 drives output shaft 38 due to the mutual engagement of splines 72 and 74, and sun gear 30 drives forward drive shaft 32 due to the mutual engagement of splines 66, 68. Preferably, the differential mode of operation produces a torque split between the forward and rear drive shafts 32, 38 that is in the ratio of 40/60, respectively.

A planetary gear assembly is provided to drive forward and rearward drive shafts at a low gear speed reduction ratio and to produce a torque split differential action to the forward and rear output shafts from the input shaft. Selection of either of these operating conditions causes an actuating component to move the planetary or epicyclic gear mechanism forward or rearward in the transmission casing.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

I claim:

1. A speed reduction and differential mechanism assembly, comprising:

an input shaft;

first and second output shafts;

a planetary gearset comprising a sun gear, ring gear, carrier and planet gears rotatably supported on the carrier and in continuous meshing engagement with the sun gear and ring gear; and means for shifting the gearset between positions spaced mutually along the input shaft, a first position where the input shaft driveably engages the sun gear, the first and second output shafts driveably engage the carrier and the ring gear is held against rotation; a second position where the input shaft driveably engages the carrier, the sun gear driveably engages the first output shaft, and the ring gear driveably engages the second output shaft.

2. The assembly of claim 1, wherein:

the ring gear includes a spline;

the input shaft includes a spline;

the first output shaft includes a spline;

the second output shaft includes a spline;

the carrier includes first and second splines;

the sun gear includes third and fourth splines; and the shifting means moves the first spline into engagement with the spline of the first output shaft, the third spline into engagement with the spline of the input shaft, and the second spline into engagement with the spline of the second output shaft, as the shifting means moves to the first position.

3. The assembly of claim 2, wherein:

the ring gear has a fifth spline; and the shifting means moves the fourth spline into engagement with the spline of the first output shaft, the second spline into engagement with the spline of the input shaft, and the fifth spline into engagement with the spline of the second output shaft, as the shifting means moves to the second position.

4. A speed reduction and differential mechanism assembly, comprising:

an input shaft having a longitudinal axis:

a casing having a spline directed substantially parallel to said axis, formed on an inner surface of the casing;

first and second output shafts substantially coaxial with said axis;

a planetary gearset comprising a sun gear, ring gear, carrier and planet gears rotatably supported on the carrier and in continuous meshing engagement with the sun gear and ring gear; and means for shifting the gearset between first and second positions spaced mutually along said axis, a first position where the input shaft driveably engages the sun gear, the first and second output shafts driveably engage the carrier and the ring gear is held against rotation on the casing; and a second position where the input shaft driveably engages the carrier, the sun gear driveably engages the first output shaft, and the ring gear driveably engages the second output shaft.

5. The assembly of claim 4, wherein:

the ring gear includes a spline;

the input shaft includes a spline;

the first output shaft includes a spline;

the second output shaft includes a spline;

the carrier includes first and second splines; the sun gear includes third and fourth splines; and the shifting means moves the first spline into engagement with the spline of the first output shaft, the third spline into engagement with the spline of the input shaft, the second spline into engagement with the spline of the second output shaft, as the shifting means moves to the first position.

6. The assembly of claim 5, wherein:

the ring gear has a fifth spline; and the shifting means moves the fourth spline into engagement with the spline of the first output shaft, the second spline into engagement with the spline of the input shaft, and the fifth spline into engagement with the spline of the second output shaft, as the shifting means moves to the second position.

* * * * *